United States Patent
Chandrashekar et al.

(10) Patent No.: US 11,765,446 B2
(45) Date of Patent: *Sep. 19, 2023

(54) METHODS AND SYSTEMS FOR PROVIDING DYNAMIC SUMMARIES OF MISSED CONTENT FROM A GROUP WATCHING EXPERIENCE

(71) Applicant: ROVI GUIDES, INC., San Jose, CA (US)

(72) Inventors: Padmassri Chandrashekar, Bangalore (IN); Daina Emmanuel, Bangalore (IN); Reda Harb, Issaquah, WA (US); Akshay Chetan Shah, Mumbai (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,332

(22) Filed: Aug. 1, 2022

(65) Prior Publication Data
US 2023/0007368 A1    Jan. 5, 2023

Related U.S. Application Data

(63) Continuation of application No. 17/350,313, filed on Jun. 17, 2021, now Pat. No. 11,451,885.

(51) Int. Cl.
*H04N 21/8549*  (2011.01)
*G06F 40/166*  (2020.01)
(Continued)

(52) U.S. Cl.
CPC ....... *H04N 21/8549* (2013.01); *G06F 40/166* (2020.01); *H04N 21/43076* (2020.08); *H04N 21/4532* (2013.01)

(58) Field of Classification Search
CPC ......... H04N 21/8549; H04N 21/43076; H04N 21/4788; H04N 21/4532; G06F 40/166
See application file for complete search history.

(56) References Cited

U.S. PATENT DOCUMENTS

| 10,536,542 B1 | 1/2020 | Dorner et al. |
| 10,943,125 B1 | 3/2021 | Evans et al. |

(Continued)

FOREIGN PATENT DOCUMENTS

| EP | 1578132 A1 | 9/2005 |
| WO | 2015158368 A1 | 10/2015 |

*Primary Examiner* — Anthony Bantamoi
(74) *Attorney, Agent, or Firm* — HALEY GUILIANO LLP

(57) ABSTRACT

Systems and methods are presented for providing dynamic summaries of missed content of content streaming on multiple device. A plurality of groups for a concurrent presentation of a content is identified, and a selection is received by a user via a second device to join a first group of the plurality of groups for the concurrent presentation of the content. Based on a user via the second device joining a group, a determination is made as to whether a user via the second device missed any content from the concurrent presentation of the content for the first group. Based on the detection of missed content, the system generates for the second device one or more summaries of the missed content segments and the missed reactions to the segments based on preferences associated with the user profile. In response to generating the summaries, the summaries are presented via the second device to the user.

20 Claims, 9 Drawing Sheets

(51) Int. Cl.
 *H04N 21/43* (2011.01)
 *H04N 21/45* (2011.01)

(56) References Cited

U.S. PATENT DOCUMENTS

| | | |
|---|---|---|
| 2002/0170068 A1 | 11/2002 | Rafey et al. |
| 2012/0259924 A1* | 10/2012 | Patil ..................... G06F 15/16 |
| 2016/0088352 A1 | 3/2016 | Agarwal et al. |
| 2020/0177971 A1 | 6/2020 | Puniyani et al. |

* cited by examiner

| Parameters | Mechanism | Weightage |
|---|---|---|
| Event Highlights - Audio | The Audio / Video / Subtitle and Metadata are Sampled as per the User Preference | Weightage is Auto Learned Parameter Based on Combination of Event and Selection Habits of the User |
| Video | Example Based on Preference Shot, Event Highlights | |
| Subtitle | | |
| Metadata Analysis | The Contents Abridged in Summary Can be User Interest-Specific | |
| Event-Specific Activity Level of the Group | The Conversations in Groups are Analyzed for Relevance to Event and Prioritized Based on the Activity Level in the Group | Weightage is Auto Learned Parameter Based on Combination of Event and Selection Habits of the User |
| Group Activity Peak Points | The Summarize the Top Groups Discussions and Experience, analysis of the Peak Discussions is performed | Weightage is Auto Learned Parameter Based on Combination of Event and Selection Habits of the User |
| Technical Words | The Summarize the Top Group's Discussions and Experience, analysis of Technical Words to Events is Performed | Weightage is Auto Learned Parameter Based on Combination of Event and Selection Habits of the User |
| Emotional Tones in Group | The Summarize the Top Groups Discussions and Experience, analysis of the Emotional Tones During the Events is Performed | Weightage is Auto Learned Parameter Based on Combination of Event and Selection Habits of the User |

FIG. 2

| First Group Watching NFL Game Buccaneers Against Raiders | | | | | | | |
|---|---|---|---|---|---|---|---|
| User | Event | Action | Action Time | Event ID | Start Time | End Time | Score |
| Steven | Brady Throws a TD | "That was an Awesome Throw!!" | 5:10:10 | A | 5:10:10 | 5:10:18 | 1 |
| Buddy | Brady Throws a TD | Liked Steven's Comment | 5:12 | A | 5:10:10 | 5:10:18 | 2 |
| Johnny | Brady Throws a TD | Disliked Steven's Comments, and Responding to Steven's Comment, "All Luck!! Go Raiders" | 5:12 | A | 5:10:10 | 5:10:18 | 4 |
| Johnny | Brady Throws an Interception | "Yeah !!! That's What I'm Talking About!!! Brady is Horrible!!" | 5:18 | B | 5:17:12 | 5:17:24 | 2 |
| Buddy | Brady Throws an Interception | Responding to Johnny's Comment, "You Got Lucky!!" | 5:19 | B | 5:17:12 | 5:10:24 | 4 |
| Johnny | Brady Throws an Interception | Responding to Buddy's Comment, "That was No Luck, that was DEFENSE!!" | 5:19 | B | 5:17:12 | 5:10:24 | 6 |

METHODS AND SYSTEMS FOR PROVIDING DYNAMIC SUMMARIES OF MISSED CONTENT FROM A GROUP WATCHING EXPERIENCE

CROSS-REFERENCE TO RELATED APPLICATIONS

This application is a continuation of U.S. patent application Ser. No. 17/350,313, Jul. 17, 2021, which is hereby incorporated by reference herein in its entirety.

BACKGROUND

The present disclosure relates to methods and systems for providing summaries of missed content and, more particularly, to methods and systems for generating summaries of missed content and reactions to the missed content based on simultaneously streaming content to multiple devices in a group.

SUMMARY

Although some viewers enjoy watching movies, shows, or other content alone, many viewers prefer to do so with friends or family. Watching content with others can enrich the user's viewing experience, for instance, by facilitating shared commentary and/or reactions to particular scenes or segments of the content. Scheduling conflicts and other factors, however, sometimes make it difficult for viewers to find a mutually convenient time to watch content together and lead to a viewer missing content during a concurrent presentation with friends or family. Conventional systems for providing a user with summaries of missed content present a singular summary for all missed portions of a show without regard to the relevance of the whole summary to the current content being played to the user, much less consideration of the shared commentary and/or reactions to particular scenes or segments from friends or family. Further, some viewers consuming the content with multiple groups may want to catch up on the shared commentary and/or reactions to particular scenes or segments from each group as they enter; however, catching up may be burdensome because of the large amount of content to sift through and, in fact, may impede a user's enjoyment of the content. Furthermore, the amount of bandwidth and time required to present a summary of all missed portions of the content can be substantial. The amount of time required to consume a lengthy summary may overwhelm a user's viewing experience and may diminish the user's ability to consume the shared commentary and/or reactions to particular scenes or segments.

To overcome these problems, methods and systems are disclosed herein for providing a user with summaries of missed content, especially summaries for missed portions relevant to the shared commentary and/or reactions to particular scenes or segments of the content, which are described herein. In one example, the present disclosure provides a system for generating a concurrent presentation of content to multiple devices for a group watch. The system comprises a memory communication port and control circuitry. The memory is configured to store, in association with metadata for content, shared commentary and/or reactions to particular scenes or segments of the content, and/or the like, captured via a sensor, such as a camera, a microphone, a heart rate sensor, and/or the like, during display of the content via a first device. In some embodiments, a summary application detects that a user via a second device missed a previous portion of content including shared commentary and/or reactions to particular scenes or segments of the content. For example, a summary application may receive information that a user via a second device joined a group watch for concurrent presentation after a group watch via a first device has started the show being played. In some examples, a summary application receives information that the user via the second device has left the concurrent presentation and subsequently returned to a room (e.g., virtual room) in which the show is being played and detects what content was played and comments and reactions were inputted while the user was gone from the room (e.g., virtual room). The summary application, having detected which content and shared commentary and/or reactions to particular scenes or segments were presented in the missed content, accesses metadata that identifies storylines based on time stamps. The summary application then generate a summary for the missed portions of that content and shared commentary and/or reactions to particular scenes or segments. Therefore, if the user missed different portions of, for example, three segments and shared analysis and/or reactions to particular scenes or segments, the summary application can generate a summary of the missed portions specific to the current storyline. The summary application then causes for presentation the specific summaries for the user via the second device.

In some embodiments, the system via control circuitry is configured to identify a plurality of groups for concurrent presentation of content. For example, a user is searching for groups that are watching a particular program in a watch group—e.g., a family group, a coworkers group, and unknown users, all-consuming the baseball game—each group from the plurality of groups being associated with one or more first devices, for example, a first device that joins/starts a group watch (e.g., college friends group) by initiating the concurrent presentation of the content (e.g., NY Yankees vs. Boston Red Sox baseball game). In some embodiments, the control circuitry receives, by a second device associated with a user profile, a selection to join a first group of the plurality of groups for the concurrent presentation of the content. For example, the user wants to join a concurrent presentation (e.g., group watch) of a movie, show, match, etc.; however, the user joins the presentation after the start time. In some embodiments, in response to receiving the selection to join the first group, the control circuitry detects that the user via the second device has missed portions of the concurrent presentation of the content (e.g., Yankees vs. Red Sox game) for the first group. The missed portion may include a plurality of content segments and a plurality of reactions from the one or more first devices of the first group. The control circuitry may then generate for the second device one or more summaries of the plurality of content segments and the plurality of reactions based on preferences associated with the user profile. For example, a user joining a content item (e.g., Yankees vs. Red Sox game) with college friends may have different preferences than if joining a family group or a group based on personal similarities where the user does not know the others members. In some embodiments, in response to the generating, the control circuitry may cause for the presentation one or more summaries for the second device. Thus, the summary application operates more efficiently than conventional systems in its consumption of bandwidth and processing. By displaying less information during the summary of the current storyline, the summary application spares users from time-consuming summaries that impede the user's consumption and avoids inundating the user with less relevant information in the content summary. The summary application reduces both the time required by conventional systems to play back summaries and the bandwidth and processing required by those systems.

In some embodiments, the control circuitry generates one or more summaries of the missed segments of the content for the second devices by retrieving metadata for the identified missed portion. The control circuitry then extracts a content storyline identifier from the retrieved metadata for the plurality of content segments and a reaction storyline identifier from the retrieved metadata for the plurality of reactions. For example, the control circuitry identifies the shared commentary and/or reactions to particular scenes or segments of the content missed by a user via the second device. The control circuitry identifies a plurality of storyline-specific portions in the missed portion. Each of the plurality of storyline-specific portions is associated with the segment storyline identifier or reaction storyline identifier. The control circuitry generates summaries for the plurality of storyline-specific portions in the missed content. The control circuitry then combines the summaries for the plurality of storyline-specific portions in the missed portion to generate the storyline-specific summary of the portion of the missed portion comprising the segment storyline identifier or reaction storyline identifier. The summary application may present summaries of missed portions of storylines and missed comments and reactions more efficiently and at more relevant times as a show progresses through various storylines which improves a user's enjoyment of content and retention of the storylines, as well as allows the user to catch up to the conversation among the group.

In some embodiments, the control circuitry generates one or more summaries of the missed segments of the content for the second device by accessing user preferences associated with the user profile. Further, the control circuitry retrieves metadata for the identified missed portion and extracts a reaction storyline identifier from the retrieved metadata for the identified missed portion. For example, the control circuitry extracts the shared commentary and/or reactions to particular scenes or segments and generates a list of the comments and reactions. Based on the generated list of the comments and reactions, the control circuitry may sort the commentary and reactions based on the largest number of interactions from one or more first devices. For example, comments that received more likes, up-votes, or responses are listed higher in the list for presentation to the second user device. In some embodiments, the control circuitry further combines the extracted reaction storyline identifiers in the missed portion to generate a storyline-specific summary of reactions for the missed portion. In some embodiments, a summary application may then concatenate the snippets of content and reactions into a single summary video or present several snippets to a user that collectively summarize the missed portions of the content.

In some embodiments, the control circuitry is further configured to identify the plurality of segments in the missed content, wherein each of the plurality of segments is associated with a segment summary. The control circuitry then generates for each segment of the plurality of segments a popularity score based on user preferences. For example, the interactions (e.g., likes, up-votes, comments) with each segment are tracked to determine the popularity score. The control circuitry then updates each segment of the plurality of segments with the respective popularity score. In some embodiments, the control circuitry retrieves each segment from the plurality of segments having a popularity score above a threshold, wherein each segment of the plurality of segments comprises segment summaries for the respective segment in the plurality of segments in the missed content. In some embodiments, the control circuitry is configured to combine the retrieved segment summaries with popularity scores above the threshold for presentation. In some embodiments, a summary application may then concatenate the snippets of content based on popularity scores for reactions into a single summary video or present several snippets to a user that collectively summarize the missed portions of the content. In some embodiments, the summarized content is provided based on a popularity score. In some embodiments, the summarized content is provided based on a chronicled sequence of events and a popularity score. For example, the top ten reactions are identified, and they are provided in the sequence of the content as they occurred during the missed portion of the content.

In some embodiments, the concurrent presentation of the content may include a virtual concurrent presentation of the content on a plurality of devices. For example, a system may cause presentation of synchronized content on multiple devices. In another example, multiple users desire to consume the latest baseball game between New York Yankees and Boston Red Sox at home. The first user is in Boston, while the second user is in New York. To improve their enjoyment of the content, the users are consuming the content in a watch group for concurrent and synchronized presentation on their devices in their homes.

In some embodiments, the control circuitry identifies a geographical location of the one or more first devices and a geographical location of the second device. The control circuitry determines that the geographical location of the one or more first devices and the geographical location of the second device are different geographical locations. If the first device and second device are in the same location, a summary of the missed portions may not be necessary. In some embodiments, the different geographical location is a predefined distance between the two devices.

In some embodiments, the control circuitry identifies the plurality of groups for concurrent presentation of the content by identifying a user profile associated with each device in each group of the plurality of groups. In some embodiments, the control circuitry retrieves from a social media database metadata related to each profile in each group of the plurality of groups. The control circuitry generates a group identifier based on the retrieved metadata for each user profile in a respective group. The group identifier is indicative of the social link between a first user and a second user based on a first user profile associated with the first user and a second user profile associated with the second user. The type of social link may include one or more of a parent, a sibling, a grandparent, a cousin, an uncle, an aunt, a child, a friend, and a coworker.

In some embodiments, the control circuitry may determine a summary endpoint of the summary being generated for presentation. The summary endpoint is a point at which the presentation of the summary will complete. In some embodiments, the control circuitry then modifies the summary to include a summary for the content being generated for presentation between a current point in the content and the summary endpoint.

In some embodiments, the causing for presentation of the one or more summaries for the second device includes identifying a secondary display from a plurality of displays associated with the second device. The secondary display is available to display the summary and is not presenting the content or the reactions. The control circuitry directs the secondary display to present the summary.

In some embodiments, to present the one or more summaries for the second device, the control circuitry further includes identifying a primary display from a plurality of displays. The primary display is presenting the concurrent presentation of the content. The control circuitry then directs the primary display to pause the concurrent presentation of the content during the presentation of the generated summary.

In some embodiments, the system is integrated to social media networks (e.g., Facebook, Twitter, LinkedIn, etc.) and media consumption platforms (e.g., TiVo, Netflix, Amazon). For example, the system accesses the databases of the social network and the media consumption platforms to gain insight into the users. Using the insight from these platforms and networks, i.e., metadata about the users consuming content, permits the system to better characterize groups for shared content presentation. In some embodiments, the groups may be pre-defined as private groups based on social media groups. In some embodiments, the groups may be public groups that require an invitation to join chat rooms for discussion of games or can be forum-based groups. In some embodiments, an event start time is regarded as $TP_1$, and $TP_2$ may be at a later time in the programming. The timepoints may keep a threshold of $TP_1+x$ where x is a value of significance for content progress to provide a catch-up preview to the user. That is, for the user to appreciate the catch-up, there has to be something to catch up on. If the user missed the introductory credits of a program, there might not be anything to catch-up on.

In some embodiments, where a value of significance for content progress has occurred, the system may provide the user with a catch-up summary (summary of missed content) based on the various groups prioritized and the activity level in the specific groups.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an example database of a system for generating the summaries of missed content and reactions to the missed content, in accordance with some embodiments of the disclosure;

FIG. 3 shows an example database of collected reactions for generating the summaries of missed content and reactions to the missed content, in accordance with some embodiments of the disclosure;

DETAILED DESCRIPTION

The present disclosure is related to methods and systems for providing a user with summaries of missed content, especially summaries for missed portions relevant to the shared commentary and/or reactions to particular scenes or segments of the content item. An exemplary user equipment device may be capable of displaying a variety of content types, such as standard video content, audio or a combination of both.

Figure 1:
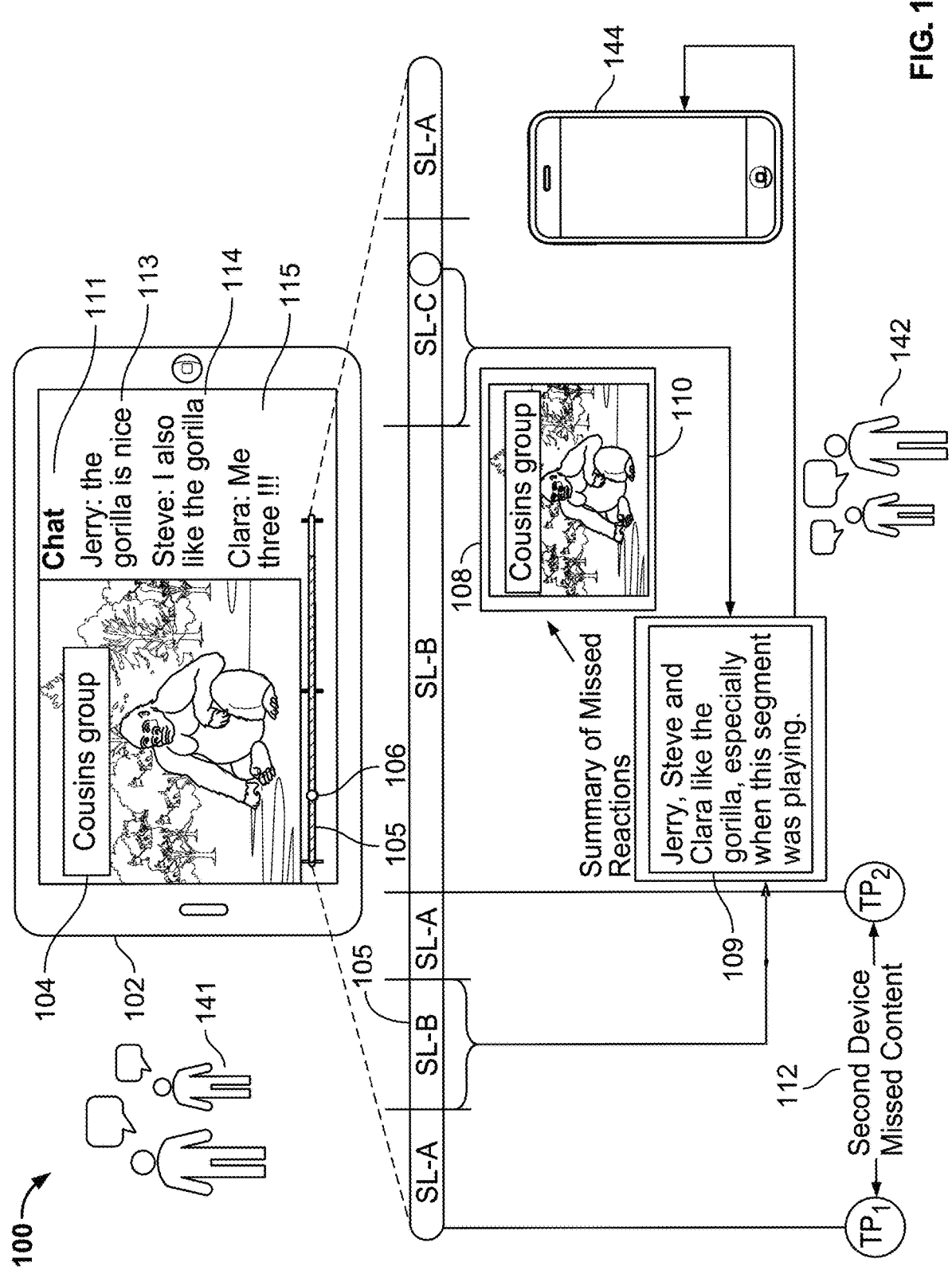
FIG. 1 shows an illustrative example of a system for generating summaries of missed content and reactions to the missed content based on simultaneously streaming content to multiple devices in a group, in accordance with some embodiments of the disclosure.

FIG. 1 shows an illustrative example of a system for providing summaries of multiple content items from a group watching a concurrent presentation of content, in accordance with some embodiments of the disclosure. FIG. 1 depicts a first device 102, associated with a first group 141 of users, which is displaying content 104 (illustrated as an image of a movie). User equipment 102 is depicted as a television device in FIG. 1. In some embodiments, user equipment 102 may be a smartphone, a smart television, a personal computer, a laptop computer, a tablet computer, or any other type of computing device that has displays and/or audio drivers, such as speakers, that are respectively configured to visibly and/or audibly present content to one or more nearby users and suitable for rendering content (e.g., movies, television shows, linear programming, and over-the-top (OTT) content) during the concurrent presentation of the content among a plurality of devices, for example, synchronized presentation of the same content on multiple devices. In some examples, the devices are in distinct locations apart from each other. The user equipment is also displaying a time bar 105 that includes a current position indicator 106, which is approximately 80 percent complete for the content.

In FIG. 1, two viewers 141 are observing content 104 on a first device 102. While content 104 is generated for consumption on the first device 102, a supplemental content 111 (e.g., chatbox) is generated among all users present in the group consuming the content. For example, the second content may be shared commentary and/or reactions to particular scenes or segments as they happen or video streaming of different users viewing the scenes or segments. In some embodiments, a camera may be a part of the first device 102 and the second device 108 and may track the faces of viewers 141 and 142. In some embodiments, the one or more first devices employ a camera system that captures the users' facial expressions so that the users in the group consuming the concurrent presentation can interact and engage as they both consume the content at different devices. In some embodiments, the supplemental content may include video and audio streaming of facial expressions and sounds of the users consuming the content 104 on the first device 102. In the illustrative example of FIG. 1, the supplemental content 111 shares comments from Jerry ("The gorilla is nice") 112, Steven ("I like the gorilla") 113, and Clara ("Me three!!!") 114 as content 104 is presented on the first device. Further, viewer or viewers 142 may join the first group watch to consume content 104 on a second device 108. The second device may be in a remote and different geographical location. The summary application detects that viewers 142 associated with the second device 108 missed some portion of the content 104 between two timepoints, $TP_1$ and $TP_2$ because a user arrived late to the group watch. In some embodiments, the two-timepoints, $TP_1$ and $TP_2$ may be in the middle, end, or multiple missed portions, each with two-timepoints, $TP_1$ and $TP_2$. In some embodiments, the summary application may determine that viewer or viewers 142 missed this portion of the content by tracking viewers that are present in the group watch of the concurrent presentation of the content 104. As part of the missed portion of the content, the summary application may determine that the viewer or viewers 142 also missed portions of the reactions and shared commentary during the presentation of content 104. In a scenario in which the camera is unable to detect one or more viewers for a time period, the summary application may determine that the user or users are absent and may record portions of the content 104 and supplemental content 111 and indicate that a viewer is missing in an interaction log the shared commentary and/or reactions to particular scenes or segments from the other viewers. In some embodiments, the summary application may track which portions of content a viewer is present for and log that information in an interaction log specific to a viewer. The summary application may then reference the interaction log for that viewer at a later time and determine that particular content, or portions of content 104 and supplemental content 111 (e.g., the shared commentary and/or reactions to particular portions of content), are not in the interaction log, which indicates that the viewer missed the content or portions of content and the reactions to those portions. The summary application may detect when viewer 142 returns to the viewing area of content 104 at a timepoint $TP_2$ (marked by current position indicator 106), e.g., using the same techniques used to build the interaction log. The summary application may also determine that a summary of the missed content between timepoints $TP_1$ and $TP_2$ should be presented to viewer 142 without interrupting the playback of content 104 for viewer 141 on the first device 102.

In FIG. 1, the summary application determines which portions of the missed content and supplemental content 111 to include in the summary for viewer 142 on second device 108. For example, the summary application may compare the time period, user engagement (number of comments and likes that were received for a scene) for which viewer 142 was absent from the viewing watch group to the timeline of the content 104. Using this information, the summary application can determine which time period of the content 104 and supplemental content 111 the viewer 142 has missed. The summary application may split content 104 into portions of any appropriate size, and the portions may not be the same size. In some embodiments, the summary application may split content 104 into portions that also received supplemental content 111. The portions illustrated in FIG. 1 are exemplary. In some embodiments, the summary application may split content 104 into portions where supplemental content was received and present only portions of content with supplementary comments. In some embodiments, the summary application may generate a summary based on the portions of content and the supplemental content on the second device 108. The summary application may then continue to prepare the summary based on the missed content (portions of the content and supplements content). Upon the viewer 142 with the second device 108 joining the group watch of content 104, a summary may be presented on the second device 108 to catch up on the missed content 110. For example, a number of users commented on a football game when an exciting play occurred, and the summary application may split content 104 into portions that include the exciting play that received reactions from users. Based on the reactions received for the content, the summary application may provide the portion along with the reaction to the second device upon a user arriving late to the viewing of the content.

FIG. 2 shows an example of a table that the system employs, which contains information about parameters, mechanism and weightage providing summaries of multiple content items from concurrent presentation via group watch, in accordance with some embodiments of the disclosure. The table structure provides parameters, mechanism and weightage for which a summary application may consider to evaluate how to generate a summary. The summary application may consider a parameter from the event highlights, including audio, video, subtitles and metadata analysis and evaluate the parameter using the associated mechanisms. For example, the summary application may sample the audio, video, subtitles, and metadata as per the user's preferences. The summary application may consider the video including the angle which the user prefers to view the content. Based on the user's preferences, the summaries may be generated from the missed portion of content 104 including the supplemental content 111. The summary application may collect such data to track user preferences and learn user preferences based on the events and the user inputs.

As shown in FIG. 2, in some embodiments, the table structure may be utilized to determine event-specific groups that the user may want to join. For example, the user may want to join a particular group for the presentation of a football game. In some embodiments, the user may want to join a group based on the content that the user wants to consume. For example, a user wants to watch a show and searches for groups that are watching this show. In some embodiments, the system may recommend groups to the user to join based on the user preferences. For example, the user enjoys watching sporting events with college friends. In another example, the user enjoys watching shows with a brother. Based on a sporting event searched by the user, the system may recommend a college buddies group to join. Similarly, based on a show searched by the user, the system may recommend a family group to join. In another embodiment, the user may want to join a group based on the popularity of the group or another metric. For example, the user may want to join the most popular group, or a funny group, or a group of like-minded supporters of a sports team for the concurrent presentation. The system searches for and recommends groups for the user to join for simultaneous presentation. In some embodiments, a recommendation of a listing of the identified groups is provided for the user to join. The system may evaluate each group based on the conversations made within the group consuming the content and a social link to the second device user. In some embodiments, the highest activity (e.g., engagement) within a group may be used to assess whether a user may want to join the group. For example, the summary application may track the number of comments and likes received in response to an event occurring in the content. In yet another embodiment, the system may evaluate the terminology used in the group to determine if the user may want to join the group. For example, using technical terms that are not suitable for a novice may be identified. In still another embodiment, the system may evaluate the emotional tones of the group to determine if the user may want to join the group. In each case, the summary application considers the particular parameters, e.g., events, content, activity, technical terminology, and emotions, to identify the group and its characteristics. Such data is continuously tracked and updated to improve the weightage of each of the parameters.

In some embodiments, the conversations in the group are analyzed to determine relevance to the event, group activity, technicality, emotions, etc., and are prioritized. For example, a group of friends who are consuming content together but are engaging with personal supplemental content not related to the content may not be desirable, while on the other hand, friends who provide supplemental content related to the content may be more desirable. In some embodiments, data from a social network may be accessed to determine the preferences of the users within the group. Each of the groups may be different based on the users within each group. In some embodiments, each user is associated with a user device concurrently consuming the content. The groups for the user to join with the second device may be based on user preferences. For example, the user may prefer to consume some content with college friends where video cameras 413 are employed to capture facial expressions. On the other hand, the user may prefer to engage with the users only based on chat for other groups.

In some embodiments, the system may consider the information when evaluating the missed portion from the content (e.g., content 104), including the supplemental content 111 (e.g., reactions, shared comments, etc.). Often content (e.g., movie, show, or sporting event) comprises one or more storylines, which are narratives that, along with other narratives, make up a plot. Portions of the content may correspond to various storylines. In FIG. 2, the data structure evaluates each portion of the content to determine how to weigh each parameter based on user feedback. This indicates which missed portions the user may be interested in to catch up, upon joining the presentation. Content may contain contiguous reactions and feedback or may switch between several reactions and feedback. In some embodiments, the information describing the portions and reactions that make up a missed portion of the content may be stored in the content metadata. By analyzing the metadata, the summary application may be able to determine which portions and reactions viewer 142, for example, missed based on the timepoints $TP_1$ and $TP_2$.

In FIG. 1, viewer 142 has missed a first part of storyline A, a first part storyline B, and a second storyline A, and has arrived during a presentation of a second part of storyline B (denoted as SL-A, SL-B, and SL-A in FIG. 1). Similarly, the missed parts include the feedback received from other users in the group. The summary application determines a storyline-specific summary for viewer 142 when viewer 142 joins at timepoint $TP_2$. The summary application may create a summary that includes a portion of the content and supplemental content associated with that portion that is necessary for viewer 142 to understand the content 104 and the engagement by other users at timepoint $TP_2$ in the group. In other words, the summary application is generating content related to storyline B at timepoint $TP_2$ and the reactions received. Therefore, the summary application can generate a summary relevant to the current content by summarizing the storyline B content that was missed by viewer 142 between timepoints $TP_1$ and $TP_2$. In some embodiments, the summary application may further include other portions of content 104 on which storyline B is dependent in the summary at timepoint $TP_2$. The summary application may access the data structure in FIG. 2 to determine which portions of storylines A and B to include in the summary based on dependency. In some embodiments, the summary application may summarize other missed portions of content 104 at a later point. In some embodiments, the summary application may summarize other missed portions of content 104 at the beginning and may present the supplemental content first. For example, the summary application may present a summary of the missed portions of shared content and reactions before playing the scene associated with the reactions. In another example, the summary application may present a summary of the missed portions of reaction at the end of the program, as there are no other sections of reaction after viewer 142 arrives.

FIG. 3 shows an example database of collected reactions for providing summaries of missed content from a concurrent presentation of content in a group on multiple devices, in accordance with some embodiments of the disclosure. The database includes information about users, events, actions (activity), a time stamp for each action, event ID, start and stop time of the event, and a score derived based on an algorithm, as illustrated in FIG. 3. Often content comprises one or more reactions and shared commentary which are narratives of the discussion between users that, along with other narratives, makes up a plot of the discussion between multiple users. For example, missing part of a discussion between users may cause the subsequent discussion to be disconnected and hard to follow. The reaction to the content may correspond to various storylines. In FIG. 3, the data structure assigns each event in a content item to a particular storyline ID (e.g., storylines A, B, and C). This indicates which portions are related to the same storyline (i.e., they make up the same narrative) and may lead to grouping of reactions from the user even when they are not in sequence. Content may contain contiguous storylines or may switch between several storylines. As illustrated in FIG. 2, additional information in the data structure may include start and endpoints of each event, the reactions or shared comments received for the event and the time stamp when the reaction or shared comment is received. In some embodiments, a score is generated for each reaction to track the relevance of the reaction. For example, the more people that comment on a reaction or shared comment, the higher the score is. In some embodiments, the information describing the portions and storylines that make up content may be stored in the metadata of the content. By analyzing the metadata, the summary application may be able to determine which portions and storylines viewer 142 missed based on the timepoints $TP_1$ and $TP_2$.

Figure 4:
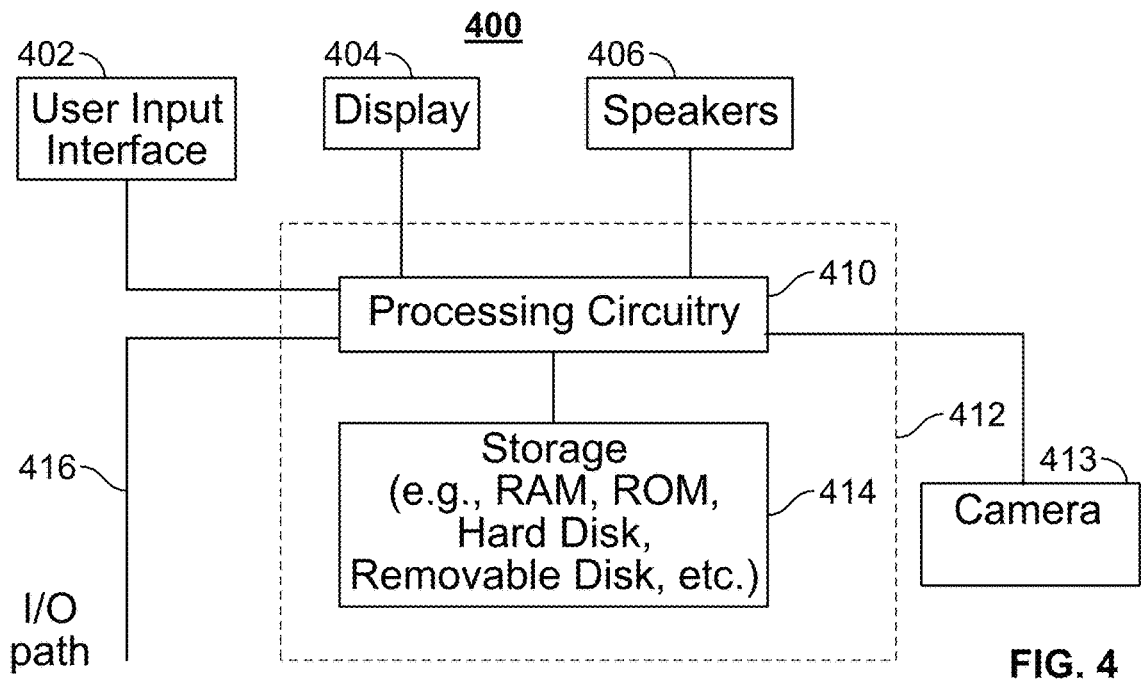
FIG. 4 depicts exemplary systems, servers and related hardware for generating the summaries of missed content and reactions to the missed content, in accordance with some embodiments of the disclosure.

FIG. 4 depicts exemplary systems, servers and related hardware for generating summaries of missed content and reactions to the missed content based on simultaneously streaming content to multiple devices in a group, in accordance with some embodiments of the disclosure. A user may access content and the content interface application (and its display screens described above and below) from one or more of their user equipment devices. Each device may connect to the communication network where content may be transmitted, processed, and pushed out. FIG. 4 shows a generalized embodiment of illustrative user equipment device 400. More specific implementations of user equipment devices are discussed above in connection with FIG. 5. User equipment device 400 may receive content and data via input/output (I/O) path 416. I/O path 416 may provide content (e.g., broadcast programming, on-demand programming, Internet content, content available over a local area network (LAN) or wide area network (WAN), and/or other content) and data to control circuitry 412, which includes processing circuitry 410 and storage 414. Control circuitry 412 may be used to send and receive commands, requests, and other suitable data using I/O path 416.

Control circuitry 412 may be based on any suitable processing circuitry such as processing circuitry 410. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 412 executes instructions for a content interface application stored in memory (i.e., storage 414). Specifically, control circuitry 412 may be instructed by the user interface application to perform the functions discussed above and below. For example, the user interface application may provide instructions to control circuitry 412 to generate the video and audio content for display. In some implementations, any action performed by control circuitry 412 may be based on instructions received from the user interface application.

In client/server-based embodiments, control circuitry 412 may include communications circuitry suitable for communicating with a content application server or other networks or servers. The instructions for carrying out the above-mentioned functionality may be stored on the content application server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 5). In some embodiments, an antenna 408 is provided in the user equipment device 400. The antenna 408 may be used for communication with the network of antennas. In addition, communications circuitry may include circuitry that enables peer-to-peer communication of user equipment devices, or communication of user equipment devices in locations remote from each other (described in more detail below).

Memory may be an electronic storage device provided as storage 414 that is part of control circuitry 412. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 414 may be used to store various types of content described herein as well as content data and content application data that are described above. Nonvolatile memory may also be used (e.g., to launch a boot-up routine and other instructions). Cloud-based storage may be used to supplement storage 414 or instead of storage 414.

Control circuitry 412 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 412 may also include scaler circuitry for upconverting and down-converting content into the preferred output format of the user equipment device 400. Control Circuitry 412 may also include digital-to-analog converter circuitry and analog-to-digital converter circuitry for converting between digital and analog signals. The tuning and encoding circuitry may be used by the user equipment device to receive and to display, play, or record content. In some embodiments, the control circuitry may include an HD antenna.

In one embodiment, speakers 406 may be provided as integrated with other elements of user equipment device 400 or may be stand-alone units. The audio and other content displayed on display 404 may be played through speakers 406. In some embodiments, the audio may be distributed to a receiver (not shown), which processes and outputs the audio via speakers 406.

In some embodiments, a sensor (not shown) is provided in the user equipment device 400. The sensor may be used to monitor, identify, and determine user presence in the proximity of the user device. For example, the user interface application running on a user equipment device may receive status data from the sensor, servers, or any other equipment device indicating the status of the group watch party. In particular, a notification may be displayed on the user equipment device that a watch party started and that the user is missing out on the fun in the cousin's group.

The user interface application may be implemented using any suitable architecture. For example, it may be a stand-alone application wholly implemented on user equipment device 400. In such an approach, instructions of the application are stored locally (e.g., in storage 414), and data for use by the application is downloaded on a periodic basis (e.g., from an out-of-band feed, from an Internet resource, or using another suitable approach). Control circuitry 412 may retrieve instructions of the application from storage 414 and process the instructions to generate any of the displays discussed herein. Based on the processed instructions, control circuitry 412 may determine what action to perform when input is received from input interface 402. For example, the movement of a cursor on an audio user interface element may be indicated by the processed instructions when input interface 402 indicates that a user interface 118 was selected.

In some embodiments, the user interface application is a client/server-based application. Data for use by a thick or thin client implemented on user equipment device 400 is retrieved on-demand and in collaboration with other devices from the first group by issuing requests to a server remote to the user equipment device 400. In one example of a client/server-based content application, control circuitry 412 runs a web browser that interprets web pages provided by a remote server. For example, the remote server may store the instructions for the application in a storage device. The remote server may process the stored instructions using circuitry (e.g., control circuitry 412) and generate the displays discussed above and below. The client device may receive the displays generated by the remote server and may display the content of the displays locally on user equipment device 400 that is synchronized with the content of the displays on other equipment devices 400 associated in the first group. This way, the processing of the instructions is performed remotely by the server while the resulting displays are provided locally on user equipment device 400. User equipment device 400 may receive inputs from the user via input interface 402 and transmit those inputs to the remote server for processing and generating the corresponding displays. For example, user equipment device 400 may transmit, via antenna 408, communication to the remote server, indicating that a user interface element was selected via input interface 402. The remote server may process instructions in accordance with that input and generate a display of content identifiers associated with the selected user interface element as described in greater detail with reference to FIG. 7. The generated display is then transmitted to user equipment device 400 for concurrent presentation to the user as well as to other members in the group watch.

In some embodiments, the user interface application is downloaded and interpreted or otherwise run by an interpreter or virtual machine (run by control circuitry 412). In some embodiments, the user interface application may be encoded in the ETV Binary Interchange Format (EBIF), received by control circuitry 412 as part of a suitable feed, and interpreted by a user agent running on control circuitry 412. For example, the user interface application may be an EBIF application. In some embodiments, the user interface application may be defined by a series of JAVA-based files that are received and run by a local virtual machine or other suitable middleware executed by control circuitry 412. In some of such embodiments (e.g., those employing MPEG-2 or other digital media encoding schemes), the user interface application may be, for example, encoded and transmitted in an MPEG-2 object carousel with the MPEG audio of a program.

Figure 5:
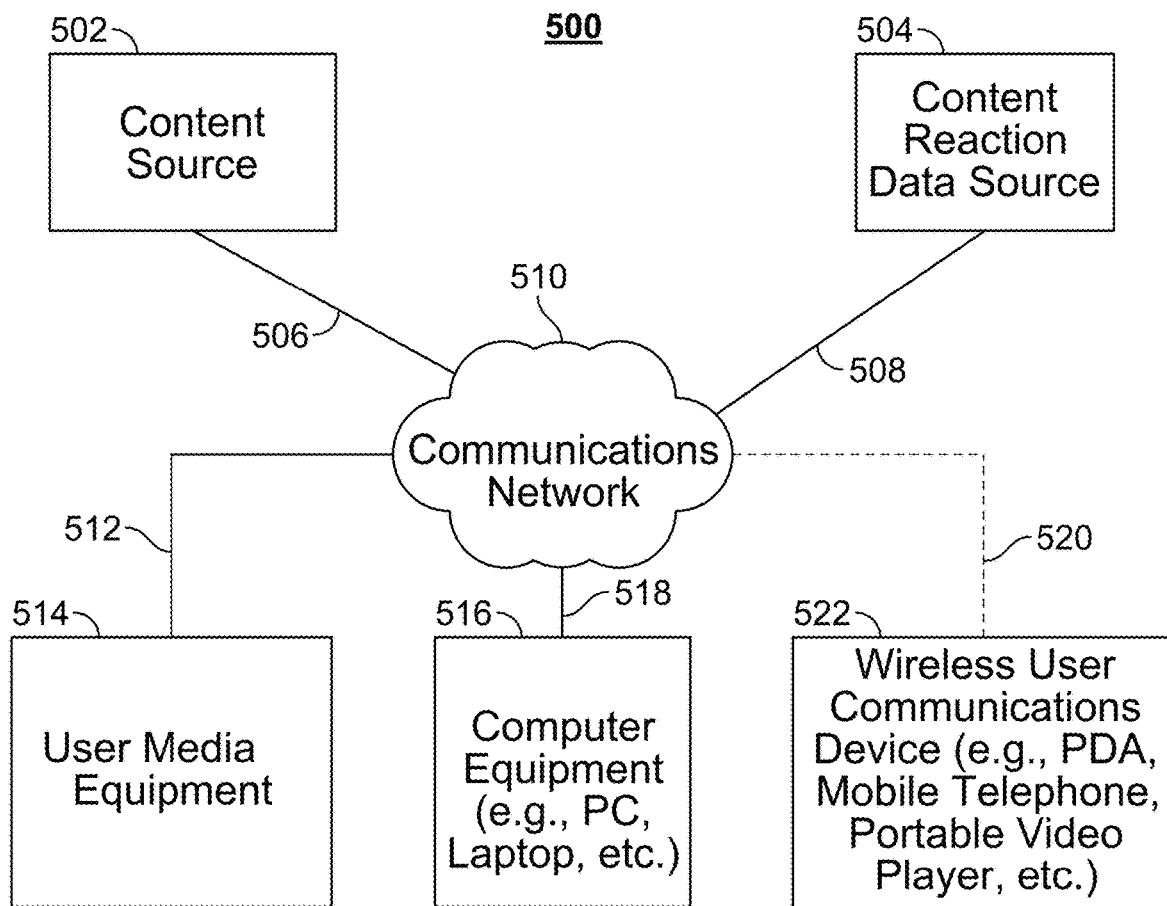
FIG. 5 depicts exemplary systems, servers and related hardware for generating the summaries of missed content and reactions to the missed content, in accordance with some embodiments of the disclosure.

User equipment device 400 of FIG. 4 can be implemented in system 500 of FIG. 5 as user media equipment 514, computer equipment 518, wireless user communications device 522 or any other type of user equipment suitable for accessing content, such as a non-portable gaming machine. For simplicity, these devices may be referred to herein collectively as user equipment or user equipment devices and may be substantially similar to user equipment devices described above. User equipment devices, on which a user interface application may be implemented, may function as stand-alone devices or may be part of a network of devices. Various network configurations of devices may be implemented and are discussed in more detail below.

FIG. 5 depicts exemplary systems, servers and related hardware for providing summaries of multiple contents from group watching a concurrent presentation, in accordance with some embodiments of the disclosure. A user equipment device utilizing at least some of the system features described above in connection with FIG. 5 may not be classified solely as user media equipment 514, computer equipment 516, or a wireless user communications device 522. For example, user media equipment 514 may, like some computer equipment 516, be Internet-enabled, allowing for access to Internet content, while wireless user computer equipment 522 may, like some user media equipment 514, include a tuner allowing for access to media programming. The user interface application may have the same layout on various types of user equipment or may be tailored to the display capabilities of the user equipment. For example, on wireless user computer equipment 516, the user interface application may be provided as a website accessed by a web browser. In another example, the user interface application may be scaled down for wireless user communications devices 522.

The user equipment devices may be coupled to communications network 510. Communications network 510 may be one or more networks including the Internet, a mobile phone network, mobile voice or data network (e.g., a 4G, 5G or LTE network), cable network, public switched telephone network, or other types of communications network or combinations of communications networks.

System 500 includes content source 502 and content reaction data source 504 coupled to communications network 510. Communications with the content source 502 and the Content reaction data source 504 may be exchanged over one or more communications paths but are shown as a single path in FIG. 5 to avoid overcomplicating the drawing. Although communications between sources 502 and 504 with user equipment devices 514, 516, and 522 are shown through communications network 510, in some embodiments, sources 502 and 504 may communicate directly with user equipment devices 514, 516, and 522.

Content source 502 may include one or more types of content distribution equipment including a media distribution facility, satellite distribution facility, programming sources, intermediate distribution facilities and/or servers, Internet providers, on-demand media servers, and other content providers. Content reaction data source 504 may provide content data, such as shared comments and reactions from other viewers consuming the content as described above. Content reaction data source 504 may be provided to the user equipment devices using any suitable approach. In some embodiments, shared comments and reactions from Content reaction data source 504 may be provided to users' equipment using a client/server approach. For example, a user equipment device may pull content data from a server, or a server may present the content data to a user equipment device. Content reaction data source 504 may provide user equipment devices 514, 516 and 522 the content reactions received from user equipment devices 514, 516 and 522 or any other user devices including the interface application itself or software updates for the user interface application.

Figure 6:
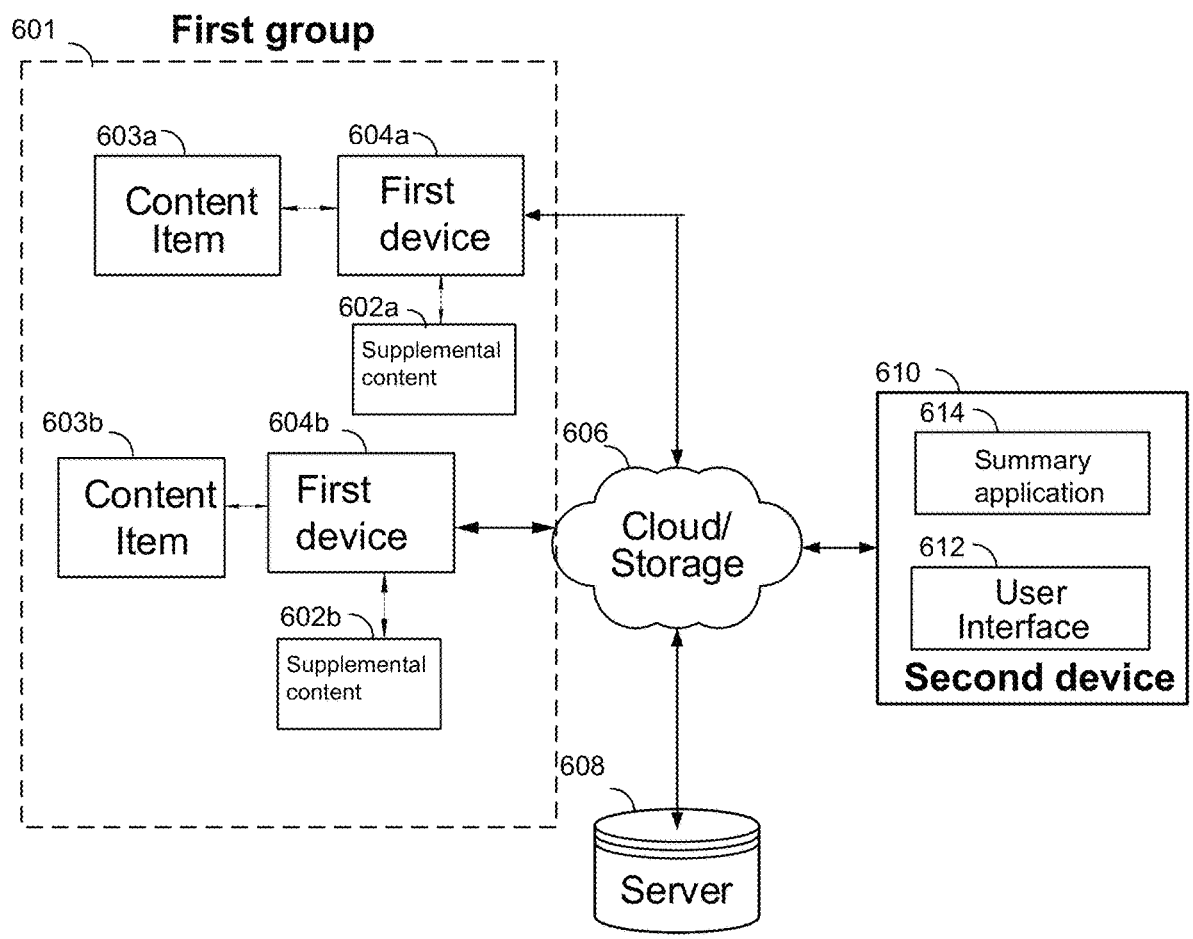
FIG. 6 depicts an illustrative example of a system of user devices for joining a group and generating summaries of missed content and reactions from the group, in accordance with some embodiments of the present disclosure.

FIG. 6 depicts an illustrative example of a device user interface application for selecting groups for content for concurrent presentation, in accordance with some embodiments of the present disclosure. FIG. 6 shows a generalized embodiment of an illustrative system 600 in which a first group 601 of users is causing for presentation a content item on individual user devices, for example, the user equipment devices 102 and 108 of FIG. 1 and the system 100 of FIG. 1 can be implemented. The presentation of the content on each device is synchronized. System 600 includes an array of user devices (e.g., first device) (e.g., 604*a*, 604*b*, etc.) causing for presentation the content item (e.g., 603*a*, 603*b*, etc.), with each content device configured to provide supplemental content (e.g., 602*a*, 602*b*, etc.). The user devices (e.g., first device 604*a*, 604*b*, etc.) may be coupled to storage device 606, server 608 and a second user device 610 providing a selection to join the first group 601. The second device 610 can communicate bidirectionally with other systems. Communications with the user devices (e.g., first device 604*a*, 604*b*, etc.) and storage device 606 may be exchanged over one or more communications paths but are shown as a single path in FIG. 6 to avoid overcomplicating the drawing.

The supplemental content (e.g., 602*a*, 602*b*, etc.) may be cataloged with time stamps based on the progress of the content item. The supplemental content 602 may be associated with the content items (e.g., 603*a*, 603*b*, etc.) received from the user devices (e.g., first device 604*a*, 604*b*, etc.) and delivered to the storage device 606. The content items 603 and supplemental content 602 are connected to server 608 for processing for content item recognition and geographical origin determination. The content items 603 and supplemental content 602 are processed through automated content recognition. The automated content recognition can store, allocate based on content and process for presentation a summary based on the user via the second device missing the content items and supplemental content 602. Server 608 may be a collection of servers connected to the storage device for improved processing. The second user device that joins the first group 601, may include a user interface 612 and a summary application 614, that communicates with the storage device 606. All of the communication between the user devices 610 in the first group, servers and the second device joining the first group may be through one or more networks including the Internet, a mobile phone network, mobile voice or data network (e.g., a 4G, 5G or LTE network), or other types of communications network or combinations of communications networks.

Figure 7:
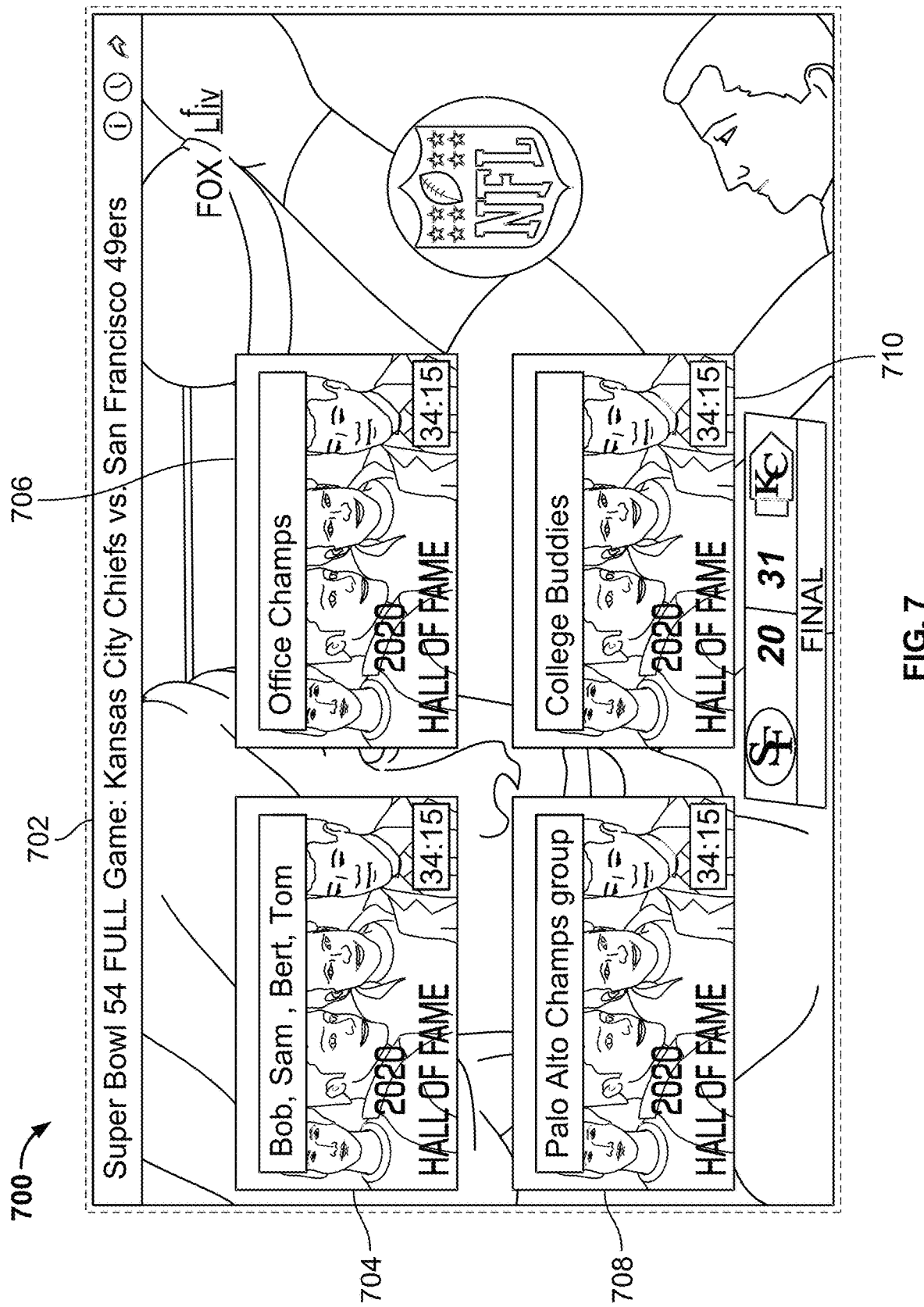
FIG. 7 depicts an illustrative example of a user interface application for selecting groups for content for concurrent presentation, in accordance with some embodiments of the present disclosure.

FIG. 7 depicts another illustrative example of a device user interface application for selecting groups for content for concurrent presentation, in accordance with some embodiments of the present disclosure. As discussed above, in some embodiments, a user of the second device may select a user interface application 702 via a user device 108 (FIG. 1) incorporated into or accompanying the user interface application 702. The user interface application 702 may be inserted into an application on any user device in response to the user searching for a group watch party. Upon determining user preferences for a group watch party, the user interface application 702 may display content items 704, 706, 708, 710 with options to select the group. In the illustrative example, the user device displays options to join one of group "Bob, Sam Bert, Tom," group "Office Champs," group "Palo Alto Champs group" and group "College Buddies," as shown in FIG. 7. As previously discussed, the groups may be arranged based on the preference of the user. In some embodiments, the user searches for groups based on the characteristics of the group. For example, the system provides a number of groups to join, a funny group or a group that includes superfans of a sports team. In some embodiments, the user may search for a group based on the specific content, for example, a particular football game.

Figure 8:
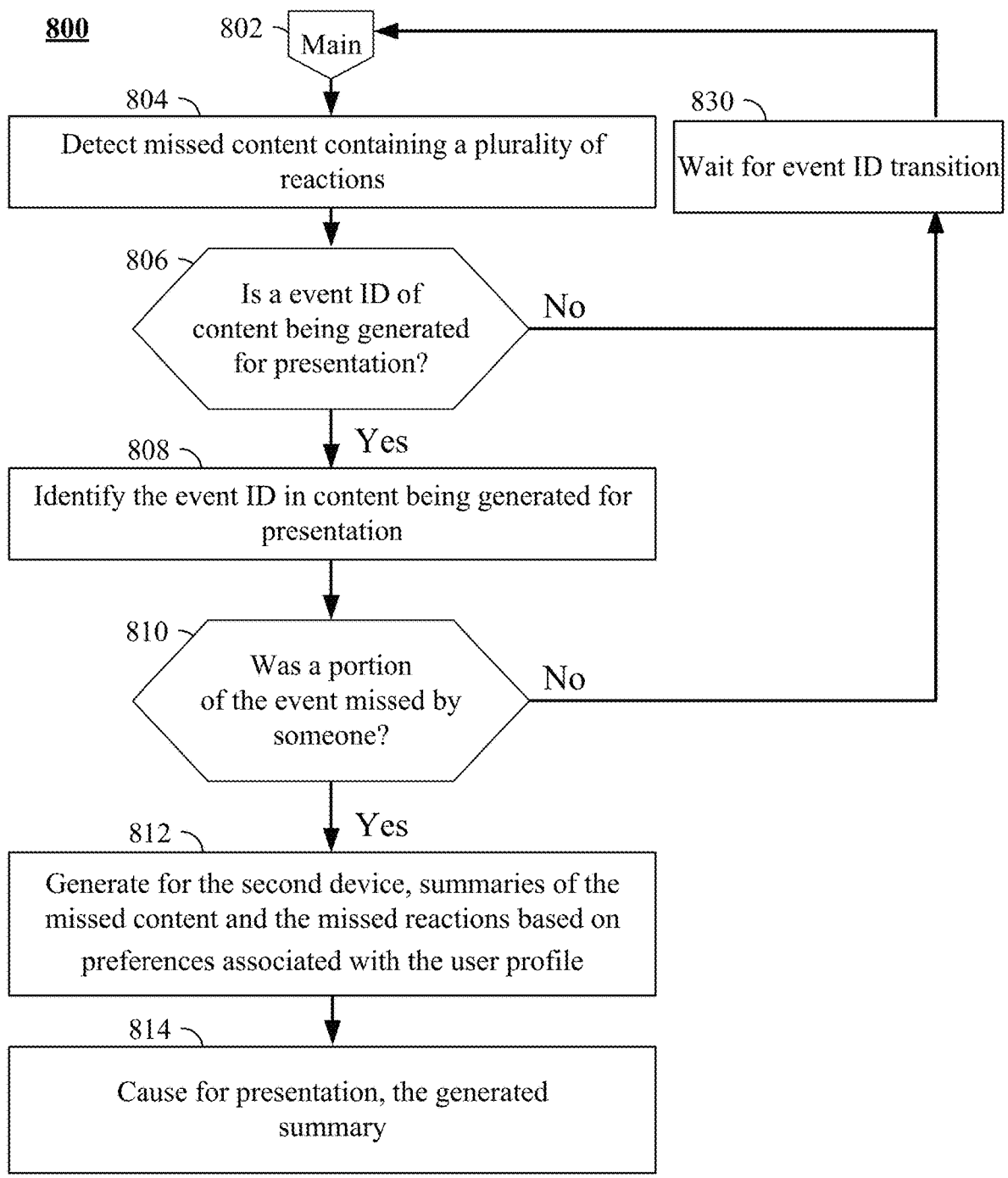
FIG. 8 is a flowchart of a detailed illustrative process for generating the summaries of missed content and reactions to the missed content, in accordance with some embodiments of the disclosure.

FIG. 8 is a flowchart of a detailed illustrative process for providing determining the missed content from the group watching the concurrent presentation, in accordance with some embodiments of the disclosure. As shown in FIG. 8, in accordance with some embodiments, a process 800 may be executed by processing circuitry 410 (FIG. 4). It should be noted that process 800 or any step thereof could be performed on, or provided by, the system of FIGS. 4 and 5 or any of the devices shown in FIGS. 1, 6 and 7. In addition, one or more of process 800 may be incorporated into or combined with one or more other steps described herein (e.g., incorporated into steps of processes 900-1200). For example, process 800 may be executed by control circuitry 412 (FIG. 4) as instructed by a user interface application implemented on a user device in order to present a summary of the missed content item based on the user device joining the first group after the concurrent presentation has started. Also, one or more steps of process 800 may be incorporated into or combined with one or more steps of any other process or embodiment.

As shown in FIG. 8, process 800 begins at step 802. At step 804, the summary application detects missed content containing a plurality of missed reactions and a plurality of portions of an event in the content. For example, the summary application may detect that a viewer (e.g., viewer or viewers 142 near user device 108) is absent during a time period while user equipment 102 is presenting content (e.g., content 104). The user is late to streaming the movie, show, or sporting event as part of a group. In some embodiments, the user joins the group late based on identifying the group after the concurrent presentation has started. In some embodiments, the summary application may detect a viewer's absence through the use of a camera 413 (e.g., as part of user equipment 400), which tracks viewers' faces. As described above, the summary application may build and access an interaction log for each viewer. In some embodiments, the summary application may access this interaction log from a remote server, and one or more devices (e.g., user equipment devices 514 and 516) may contribute to logging the viewer's interaction with content. Other techniques for determining whether a user has interacted with specific content and/or the level to which a user has interacted with specific content are described in greater detail in Agarwal et al. U.S. Patent Publ. No. 2016/0088352, published on Mar. 24, 2016, which is hereby incorporated by reference herein in its entirety. In some embodiments, the summary application may detect the viewer's presence through use of an additional user device (e.g., additional user device 144 or user equipment 514). The control circuitry (e.g., control circuitry 412) may detect the presence of the additional user device (e.g., through Bluetooth or Wi-Fi connectivity, GPS data, or another method). If the control circuitry detects that the additional user device has moved a certain distance away from a playback device (e.g., user equipment device 102), the summary application may determine that the viewer is not currently consuming the media and therefore is missing portions of the content including shared commentary and reactions to scenes. In some embodiments, the summary application may receive direct user input indicating that one viewer is temporarily leaving the viewer area, is late to join the viewing area on their independent device and may receive additional input when the viewer returns or rejoins the group watch. The summary application may record all portions which the user equipment played while the viewer was absent in an interaction log for that viewer (e.g., viewer 142). The summary application may consult the interaction log to determine that portions of the content the viewer has missed. The summary application may further consult a logic table (e.g., the table depicted in FIG. 2) and consult a data structure of user engagement (e.g., the data structure depicted in FIG. 3) to determine which storylines correspond to the portions that the viewer has missed. For example, the summary application may query the data structure using start and end times of the viewer's missed content, e.g., $TP_1$ and $TP_2$. Using the start and end times of the viewer's missed content, the query would identify rows from the data structure that coincide with the start and end times of the viewer's missed content. The data rows returned by this query would include users, events and actions for storylines in the missed content.

At step 806, the summary application determines whether a storyline of content is being generated for concurrent presentation. For example, the summary application may determine if the media content source 502 is providing content to user devices (e.g., user equipment 410) and if control circuitry (e.g., control circuitry 412) is causing the presentation of content on user device 102. In some embodiments, the summary application may determine whether the content being generated for display on user equipment 102 contains part of a storyline. For example, some content may be output (e.g., commercials or advertisements) that is not part of a storyline in content. The summary application may determine whether the content is associated with a storyline by accessing metadata associated with the content being presented (e.g., metadata in a data table such as FIG. 2) and may determine that the current presentation of content has no associated storyline or has data in the data table indicating there is no storyline. If the summary application determines that a storyline of content is not being generated for presentation, process 800 continues at step 830. If instead, the summary application determines that a storyline of content is being generated for presentation, process 800 continues at step 808.

At step 830, the summary application waits for a storyline transition. This may entail control circuitry (e.g., control circuitry 412) accessing a data structure such as the data table illustrated in FIG. 2, identifying that a storyline has concluded and continuing to 802. For example, the control circuitry may check metadata for the current content being presented to multiple devices as described above and then wait for a predetermined amount of time (e.g., 2 seconds) before checking whether the metadata has changed. Thus, the summary application may determine, based on the metadata in a data table (e.g., as shown in FIG. 2), at what timepoint a storyline transition will occur if such a point is available. For a live program, for example, a sporting event, the summary application will need to decipher when a pause in the sporting event has occurred—in some instance, a commercial. At the timepoint of the storyline transition, process 800 continues at steps 802 and 804 again. In some embodiments, the summary application may obtain metadata for the current portion to determine the current storyline and also retrieve metadata for the reactions received.

At step 808, the summary application identifies the storyline of portions where reactions have been received in the content generated for presentation. In some embodiments, the control circuitry may access metadata sent embedded in data files that comprise the content or in data files provided to the control circuitry in parallel with the content. In some embodiments, the control circuitry may access a data table (e.g., the data structure depicted in FIG. 2) to determine which storyline corresponds to the portion of the content that the user equipment 102 is currently generating, e.g., using time markers for the content.

At step 810, the summary application determines if a user (e.g., viewer 142) has missed a portion of the storyline. The control circuitry (e.g., control circuitry 412) may access a data structure (e.g., the data table depicted in FIG. 2) to determine which portions and reactions of the content that the user equipment 102 has already presented correspond to the same storyline that the user equipment 102 is currently generating. The summary application may then compare the portions of the same storyline with an interaction log for the user via the second device to see if any of the portions of the same storyline are absent from the log, indicating that the user missed those portions. In some embodiments, an interaction log contains a list of content and portions thereof (e.g., by time stamp) and reactions received for the portions, along with a unique identifier for the user as depicted in FIG. 3. Each row in such a log indicates portions of content the user missed based on a system of absence from the first group. If the summary application determines that the viewer has not missed any of the portions corresponding to the current storyline, then process 800 continues at step 830. If, instead, the summary application determines that the viewer has missed one or more portions corresponding to the current storyline, then process 800 continues at step 812.

At step 812, the summary application generates for the second device summaries of the missed content and the missed reactions based on preferences associated with the user profile. The control circuitry (e.g., control circuitry 412) may identify the portion IDs for the portions of the storyline that the viewer has missed by accessing a data structure (e.g., the data structure depicted in FIG. 2). The control circuitry may then retrieve summaries for the portions of the storyline in the missed content. In some embodiments, control circuitry generates the summary by highlighting the reactions and the content about which the reactions were received. For example, the summaries may include a display of the shared comment from the one or more first devices along with a short clip of the video during which the comment was received. The metadata for each portion of the content or the metadata for the reactions received may contain identifiers that are stored in a database (e.g., content source 502), for the portions of the content about which a reaction was received. The reaction may be a comment, a like, or a video and audio including facial expressions in response to the scenes. The control circuitry may retrieve the reactions from the content source 502 and may transmit the reactions or summaries of the reactions to the summary application. For example, suppose multiple users provide similar comments: the algorithm may summarize and combine the comments into "Jerry, Steve and Clara liked the gorilla, especially when this segment was playing." In that case, once the control circuitry has retrieved all the reactions and summaries for the portions of the storyline that the viewer has missed, the summary application may combine by splicing the portions together to generate a summary for the entirety of the missed content.

At step 814, the summary application causes for the presentation of the generated summary. The summary may comprise summaries for one or more portions of missed content. In some embodiments, the control circuitry (e.g., control circuitry 412) may transmit the summary to a secondary user device (e.g., additional user device 144, user equipment 514, or user equipment 516) via I/O path (e.g., I/O path 416). In some embodiments, the summary application may display the summary on the same device on which it is displaying content 110 (e.g., user equipment 108).

Figure 9:
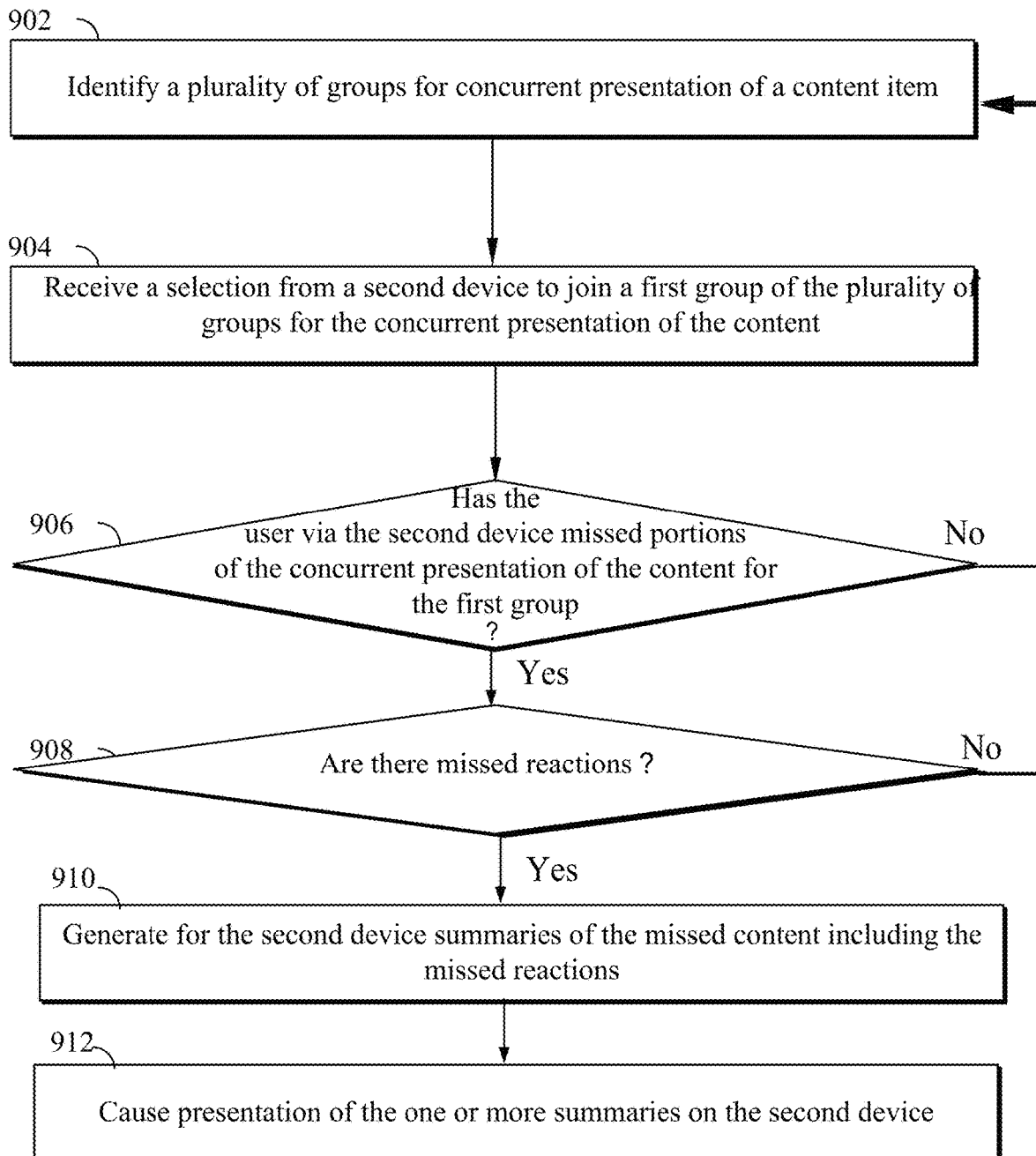
FIG. 9 is another flowchart of a detailed illustrative process for providing summaries of missed content and reactions from the simultaneous presentation of content on multiple devices, in accordance with some embodiments of the disclosure.

FIG. 9 is a flowchart of a detailed illustrative process for providing summaries of missed content from a group watch party, in accordance with some embodiments of the disclosure. At step 902, the system identifies a plurality of groups for concurrent presentation of content. For example, the system searches for groups that the user is likely to join based on the user's preferences. In some embodiments, the system may identify the groups based on the user's request to search for a particular group, for example, relatives or friends. In some embodiments, the system may identify groups based on the content the user is looking to consume. The system may further narrow the groups to particular groups based on preferences inputted. In some embodiments, the system may access the metadata associated with the user's historical viewing history to determine the type of group the user prefers to consume content with. For example, the system tracks every group the user has joined in the past. The information is stored in a database including the location, time, date, type of content, other users and any other suitable information.

At 904, the system receives a selection via a second device to join a first group of the plurality of groups for the concurrent presentation of the content. In some embodiments, the system selects the group based on user preferences. In another example, the system may receive a selection via the second device to join a cousin's group watching a sporting event.

At 906, the system determines whether a user via the second device missed portions of the concurrent presentation of the content for the first group. In some embodiments, the summary application detects content missed by a user via the second device containing a plurality of missed reactions and a plurality of portions of an event in the content. For example, as the second device joins the show's presentation, movie or event, the system determines that the user is joining the group watch after the presentation has commenced. In some embodiments, the missed portion may be due to the user leaving the group and returning to the group. In some embodiments, based on the sensors on the user device, the system may detect that the device is streaming content from the group watch. In another embodiment, a camera may capture that the user is not in the vicinity of the user device. The system uses the start and end times of the viewer's missed content. The system would identify rows from the data structure that coincide with the start and end times of the viewer's missed content. If the system determines a user via a second device missed portions of the concurrent presentation of the content for the first group ("Yes" at 906), then, at 908, the system determines whether there were missed reactions. This occurs without the user's input. If, on the other hand, the system determines a user via a second device has not missed portions of the concurrent presentation of the content for the first group ("No" at 906), then 902 may be repeated.

At 910, the system generates for the user via the second device summaries of the missed content including the missed reactions. The control circuitry (e.g., control circuitry 412) may identify the portion IDs for the portions of the storyline that the viewer has missed by accessing a data structure (e.g., the data structure depicted in FIG. 2). The control circuitry may then retrieve summaries for the portions of the storyline in the missed content. In some embodiments, control circuitry 412 generates the summary by highlighting the reactions and the content about which the reactions were received. For example, the summaries may include a display of the shared comments from one or more first devices along with a short clip of the video during which the comments were received.

At 912, the system causes the presentation of one or more summaries for the second device. The summary may include summaries for one or more portions of content and the reactions the user missed. In some embodiments, the control circuitry 412 (e.g., control circuitry 412) may transmit the summary to a second user device (e.g., additional user device 144, user equipment 514, or user equipment 516) via I/O path (e.g., I/O path 416). In some embodiments, the summary application 614 may display the summary on the same device on which it is displaying content 110 (e.g., user equipment 108).

Figure 10:
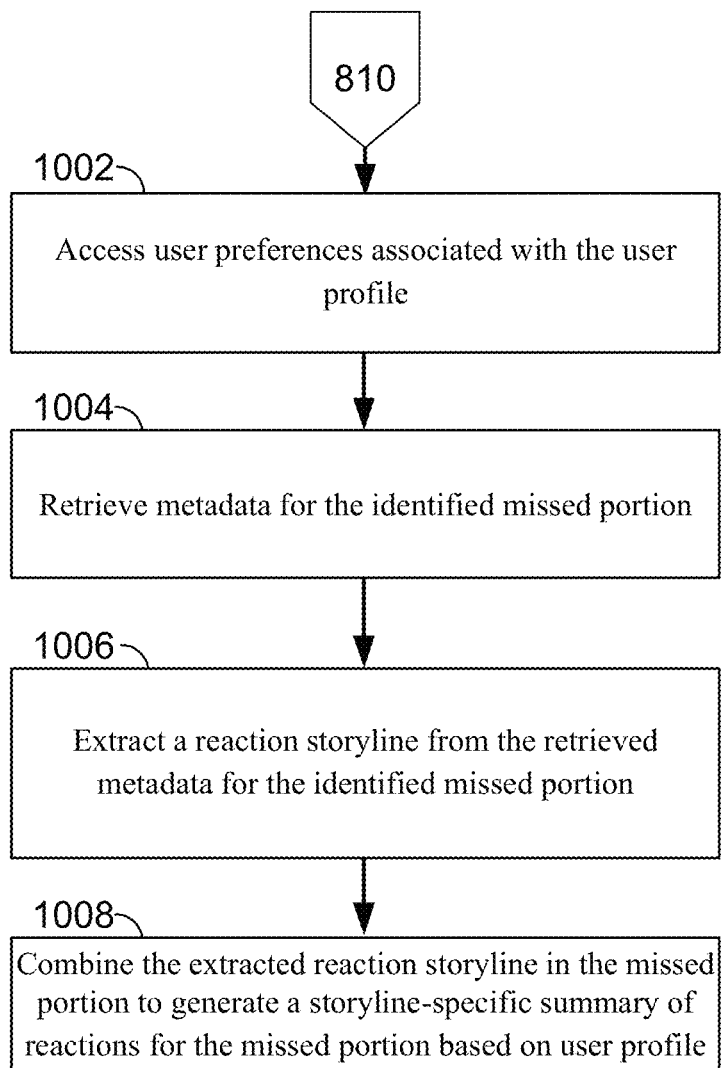
FIG. 10 is a flowchart of a detailed illustrative process for generating summaries of the missed content based on user preferences, in accordance with some embodiments of the disclosure.

FIG. 10 is a flowchart of a detailed illustrative process for providing summaries of multiple content items based on user preferences, in accordance with some embodiments of the disclosure. Process 812A is one embodiment of a method for performing step 812 of FIG. 8 and begins after step 810.

At step 1002, the summary application 614 accesses user preferences associated with the user profile. In some embodiments, the control circuitry 412 may access metadata sent embedded in data files that comprise the content or in data files provided to the control circuitry 412 in parallel with the content. The metadata may include user preferences based on the content for each portion. The control circuitry 412 may access a data structure (e.g., the data structure depicted in FIG. 3) and an interaction log for viewer B indicating which portions of the content viewer B consumed, both of which may be stored in a storage (e.g., storage 414). At step 1004, the summary application 614 retrieves metadata for the identified missed portion. In some embodiments, the summary application 614 may analyze the metadata to locate the field that comprises the missed portions. The system uses the start and end times of the viewer's missed content 110. The system would identify rows from the data structure that coincide with the start and end times of the viewer's missed content 110.

At step 1006, the summary application 614 extracts a reaction storyline from the retrieved metadata for the identified missed portion. For example, the control circuitry 412 identifies specific portions in the missed content. Each of the portions may also be associated with reactions received by the user in the first group. The control circuitry 412 may access a data structure (e.g., the data structure depicted in FIG. 3) and an interaction log for viewer 142 indicating which portions of the content viewer 142 consumed, both of which may be stored in a storage (e.g., storage 414). The summary application 614 may determine that portions that do not appear in the interaction log are missed portions of the content. The summary application 614 may further identify which portions, of the portions that do not appear in the interaction log, have a reaction (e.g., from the data structure of FIG. 2). The summary application 614 may, using this information, identify missed portions with a reaction to generate for the user.

At step 1008, the summary application 614 combines the extracted reaction storyline in the missed portion to generate a storyline-specific summary of reactions for the missed portion. The summary application 614 may combine the reactions by creating a new file with the compiled reactions or summaries of the reactions. For example, the summary application 614 may retrieve metadata for each portion being summarized (e.g., as displayed in the data structure of FIG. 3). Using this information, the summary application 614 may determine a chronological order in which to display the reactions or reaction summaries. Additionally, or alternatively, the summary application 614 may order the reactions or reaction summaries according to other criteria. For example, the summary application 614 may (e.g., using control circuitry 412) access metadata that describes how the portions are interconnected. The metadata may indicate that certain portions contain the same character, narrative, event, or some other component. The summary application 614 may then order the portion summaries according to portions that possess such similarities. The control circuitry may store the newly combined reactions or reaction summary in storage. The summary application 614 may transmit the portion summaries, in the correct order, to a queue on server 504 or directly to user equipment or display devices. Process 812A then continues with step 814, in which the summary application causes for presentation the one or more summaries for the second device.

It is contemplated that the steps or descriptions of FIGS. 8-10 may be used with any other embodiment of this disclosure. In addition, the steps and descriptions are described in relation to FIGS. 8-10 may be done in alternative orders or in parallel to further the purposes of this disclosure. Any of these steps may also be skipped or omitted from the process. Furthermore, it should be noted that any of the devices or equipment discussed in relation to FIGS. 4-5 could be used to perform one or more of the steps in FIGS. 8-10.

As used herein, "a user interface application" refers to a form of content through an interface that facilitates access to audio, music, news and podcast content on one or more display devices operating on any capable device. In some embodiments, the user interface application may be provided as an online application (i.e., provided on a website) or as a stand-alone application on a server, user device, etc. The user interface application may also communicate with an antenna array or telematics array to receive content via a network. Various devices and platforms that may implement the user interface application are described in more detail below. In some embodiments, the user interface application and/or any instructions for performing any of the embodiments discussed herein may be encoded on computer-readable media. Computer-readable media includes any media capable of storing instructions and/or data. The computer-readable media may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, media card, register memory, processor caches, random access memory (RAM), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), a collection of episodes in a series, a single episode in a series, video clips, audio, content information, pictures, rotating images, documents, playlists, websites, articles, books, electronic books, blogs, advertisements, chat sessions, social media, chat rooms, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "group watch" or "group watch party" or "concurrently presented to group watch party" should be understood to mean two or more devices where the same content is streamed simultaneously their respective devices with the device's locations being remote from each other. For example, the first device presents a football game in New York, while the second device presents that same football game in Florida and simultaneously providing feedback via a chat room, a video conferencing software or any other means for providing reactions to the content. The intent of the group watch is to simulate the two users watching the football game together.

As referred to herein, the phrase "in response" should be understood to mean automatically, directly and immediately as a result of, without further input from the user, or automatically based on the corresponding action where intervening inputs or actions may occur.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, from a first device, a selection to join a group of devices for a concurrent presentation of content; and
   in response to receiving the selection;
       determining, for the first device, missed content from the concurrent presentation prior to joining of the first device, wherein the missed content comprises (i) content segments of the content and (ii) reactions transmitted by one or more devices of the group of devices;
       generating a summary of the content segments and the reactions based on preferences associated with the first device; and
       causing to be presented the summary for the first device.

2. The method of claim 1, wherein generating the summary based on the preferences comprises:
   accessing a data structure comprising a content parameter and a sampling criterion corresponding to the content parameter;
   selecting the content segments and associated reactions based on the content parameter;
   extracting preferred segment samples from the selected content segments and reactions that match the sampling criterion; and
   generating the summary to include the preferred segment samples.

3. The method of claim 1, wherein generating the summary comprises:
   accessing metadata that comprises a content storyline identifier for the content segments;
   determining a reaction storyline associated with the content storyline identifier;
   identifying a plurality of storyline-specific portions associated with the content storyline identifier or the reaction storyline; and
   generating a storyline-specific summary for the plurality of storyline-specific portions.

4. The method of claim 3, wherein generating the storyline-specific summary comprises:
   generating summaries corresponding to the plurality of storyline-specific portions; and
   combining the summaries to generate the storyline-specific summary.

5. The method of claim 1, wherein the concurrent presentation of content comprises a virtual presentation of the content on a plurality of devices.

6. The method of claim 1, further comprising:
identifying user profiles corresponding to the group of devices;
accessing, from a social media database, metadata associated with the user profiles; and
generating, based on the metadata, an identifier indicating a social link between a first user profile and a second user profile of the user profiles.

7. The method of claim 6, wherein a type of the social link comprises one or more of a parent, a sibling, a grandparent, a cousin, an uncle, an aunt, a child, a friend, and a coworker.

8. The method of claim 1, wherein the selection is received at a first time, the method further comprising:
determining that the first device previously left the concurrent presentation at a second time; and
wherein the missed content for the first device was presented to the group between the second time and the first time.

9. The method of claim 1, wherein causing to be presented the summary comprises:
identifying a display associated with the first device, wherein the display is not presenting the content; and
directing the second display to present the summary.

10. The method of claim 1, wherein the content comprises a sporting event, and wherein the summary comprises highlights from the sporting event and reactions from the one or more devices corresponding to the highlights.

11. A system comprising:
memory configured to store content for concurrent presentation; and
control circuitry configured to:
receive, from a first device, a selection to join a group of devices for a concurrent presentation of content; and
in response to receiving the selection;
determine, for the first device, missed content from the concurrent presentation prior to joining of the first device, wherein the missed content comprises (i) content segments of the content and (ii) reactions transmitted by one or more devices of the group of devices;
generate a summary of the content segments and the reactions based on preferences associated with the first device; and
cause to be presented the summary for the first device.

12. The system of claim 11, wherein the control circuitry, when generating the summary based on the preferences, is configured to:
access a data structure comprising a content parameter and a sampling criterion corresponding to the content parameter;
select the content segments and associated reactions based on the content parameter;
extract preferred segment samples from the selected content segments and reactions that match the sampling criterion; and
generate the summary to include the preferred segment samples.

13. The system of claim 11, wherein the control circuitry, when generating the summary, is configured to:
access metadata that comprises a content storyline identifier for the content segments;
determine a reaction storyline associated with the content storyline identifier;
identify a plurality of storyline-specific portions associated with the content storyline identifier or the reaction storyline; and
generate a storyline-specific summary for the plurality of storyline-specific portions.

14. The system of claim 13, wherein the control circuitry, when generating the storyline-specific summary, is configured to:
generate summaries corresponding to the plurality of storyline-specific portions; and
combine the summaries to generate the storyline-specific summary.

15. The system of claim 11, wherein the concurrent presentation of content comprises a virtual presentation of the content on a plurality of devices.

16. The system of claim 11, wherein the control circuitry is further configured to:
identify user profiles corresponding to the group of devices;
access, from a social media database, metadata associated with the user profiles; and
generate, based on the metadata, an identifier indicating a social link between a first user profile and a second user profile of the user profiles.

17. The system of claim 16, wherein a type of the social link comprises one or more of a parent, a sibling, a grandparent, a cousin, an uncle, an aunt, a child, a friend, and a coworker.

18. The system of claim 11, wherein the selection is received at a first time, and wherein the control circuitry is further configured to:
determine that the first device previously left the concurrent presentation at a second time; and
wherein the missed content for the first device was presented to the group between the second time and the first time.

19. The system of claim 11, wherein the control circuitry, when causing to be presented the summary, is configured to:
identify a display associated with the first device, wherein the display is not presenting the content; and
direct the second display to present the summary.

20. The system of claim 11, wherein the content comprises a sporting event, and wherein the summary comprises highlights from the sporting event and reactions from the one or more devices corresponding to the highlights.

* * * * *